United States Patent [19]

Yagi et al.

[11] Patent Number: 4,741,310
[45] Date of Patent: May 3, 1988

[54] IGNITION TIMING CONTROL SYSTEM FOR INTERNAL COMBUSTION ENGINE

[75] Inventors: Shizuo Yagi, Asaka; Yoshiaki Hirosawa, Shiki; Makoto Kawai, Tokorozawa; Yorihisa Yamamoto, Shiki; Haruhiko Yoshikawa, Niiza; Kenichi Nakamura, Fujimi, all of Japan

[73] Assignee: Honda Giken Kogyo Kabushiki Kaisha, Tokyo, Japan

[21] Appl. No.: 868,587

[22] Filed: May 30, 1986

[30] Foreign Application Priority Data

May 30, 1985 [JP] Japan ................... 60-117231
Feb. 25, 1986 [JP] Japan ................... 61-40109
Feb. 25, 1986 [JP] Japan ................... 61-40108

[51] Int. Cl.$^4$ ............... F02P 5/15; F02P 5/14; F02B 5/04
[52] U.S. Cl. .................... 123/425; 123/416; 123/417
[58] Field of Search ............ 123/425, 406, 416, 417, 123/418, 502

[56] References Cited

U.S. PATENT DOCUMENTS

| | | | |
|---|---|---|---|
| 3,957,023 | 5/1976 | Peterson | 123/425 |
| 4,190,027 | 2/1980 | Inui et al. | 123/425 |
| 4,211,194 | 7/1980 | Hattori et al. | 123/417 |
| 4,328,779 | 5/1982 | Hattori et al. | 123/416 |
| 4,397,285 | 8/1983 | O'Neill | 123/502 |
| 4,406,265 | 9/1983 | Brandt et al. | 123/425 |
| 4,417,556 | 11/1983 | Latsch | 123/425 |
| 4,466,408 | 8/1984 | Cheklich | 123/425 |
| 4,481,925 | 11/1984 | Karau et al. | 123/425 |
| 4,539,957 | 9/1985 | Haruguchi et al. | 123/425 |
| 4,541,382 | 9/1985 | Hasoa et al. | 123/425 |
| 4,542,727 | 9/1985 | Britsch et al. | 123/425 |
| 4,549,513 | 10/1985 | Douaud et al. | 123/425 |
| 4,582,034 | 4/1986 | Iwata | 123/425 |
| 4,596,218 | 6/1986 | Karau et al. | 123/425 |
| 4,601,272 | 7/1986 | Nagai | 123/425 |
| 4,638,780 | 1/1987 | Trinh et al. | 123/425 |
| 4,640,249 | 2/1987 | Kawamura et al. | 123/425 |
| 4,660,535 | 4/1987 | Asano | 123/425 |

Primary Examiner—Raymond A. Nelli
Attorney, Agent, or Firm—Birch, Stewart, Kolasch & Birch

[57] ABSTRACT

An ignition timing control system for an internal combustion chamber includes means for holding a maximum peak position signal of an indicative pressure signal at each engine cycle, means for picking up the held maximum peak position data signal, and means for establishing a suitable ignition angle for keeping the ignition timing to a target optimum ignition timing on the basis of the picked-up maximum peak position signal. The pick-up period is restricted within a narrow crank angle region in which any appreciable level of noises will not be expected in the indicative pressure signal. The narrow crank angle region is defined precisely by counting clock or timing pulses produced therein up to a predetermined number or by supervising the variation in level of the indicative pressure signal.

7 Claims, 18 Drawing Sheets

FIG. 17
FIG. 18
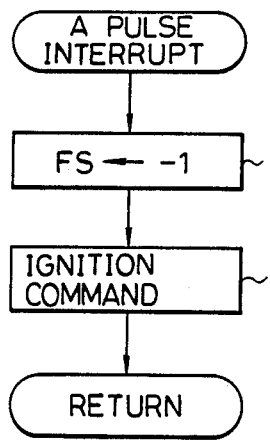
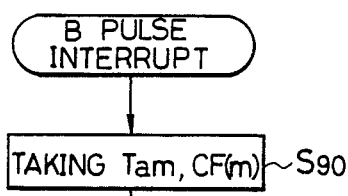
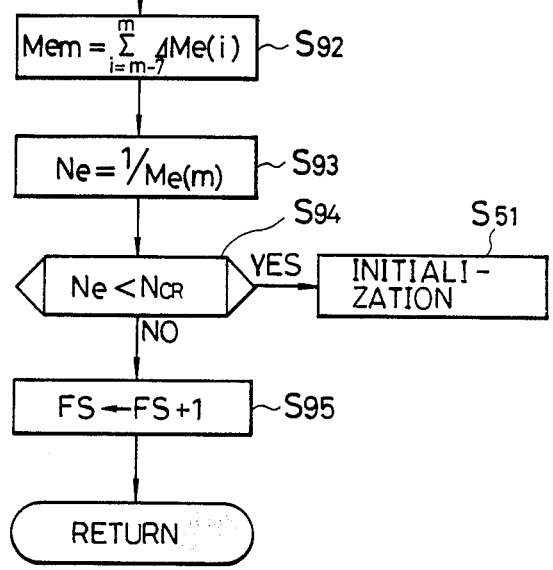

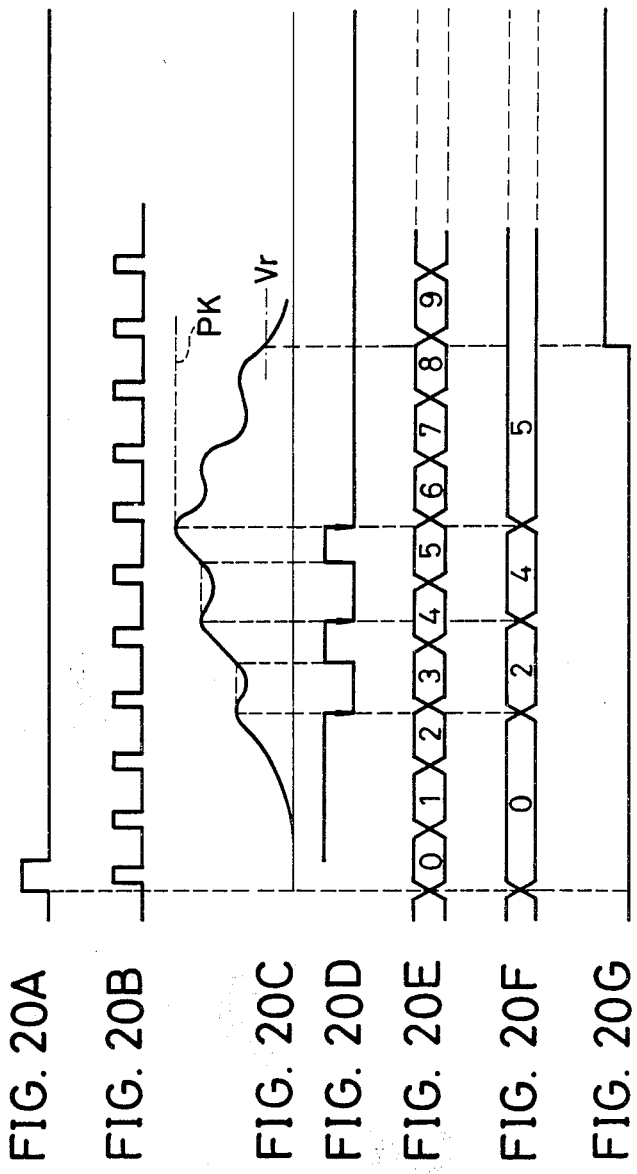

IGNITION TIMING CONTROL SYSTEM FOR INTERNAL COMBUSTION ENGINE

FIELD OF THE INVENTION

The present invention relates to an ignition timing control system for an internal combustion engine and, in particular, to an ignition timing control system for controlling the ignition timing of an internal combustion engine so as to cause the maximum pressure within the combustion chamber due to combustion to occur during an optimum crank angle region.

BACKGROUND OF THE INVENTION

It is possible to obtain the so-called indicative pressure signal representative of the inner pressure of the combustion chamber of an internal combustion engine by providing a pressure sensor such as a piezo-electric element in a bore formed through a member forming the combustion chamber of the engine such as a cylinder head. A pressure gauge may be otherwise interposed between the cylinder head and the cylinder block of the engine, which functions as the pressure sensor for producing the indicative pressure signal.

It will be seen that the internal pressure in the combustion chamber under operation of the engine changes as indicated by a curve A in FIG. 1. When the ignition system of the engine is triggered at an ignition angle $\theta$ IG, the air-fuel mixture supplied thereto starts firing with a time delay of $\theta$ d and, subsequently, the internal pressure rapidly increases up to a maximum pressure peak (referred to as an indicative pressure peak hereinafter) and then decreases.

It is known that a crank angle position of the indicative pressure peak has a certain relationship with the state of the engine at which the maximum output is produced, and the indicative pressure peak giving the maximum engine output has been found, by experiment, to be located between 12 to 13 degrees after the top dead center (referred to as ATDC hereinafter) as shown in the drawings. Therefore, ATDC 12 to 13 degrees may be considered as an ideal crank angle region. It is therefore desirable to determine the ignition timing $\theta$ IG so that the indicative pressure peak occurs within the ideal crank angle region which is ATDC 12 to 13 degrees.

Even if, however, the ignition timing $\theta$ IG is determined, the indicative pressure peak varies from time to time depending on the operating conditions of the engine and, therefore, an ignition timing control device is desired which can keep the indicative pressure peak within the optimum region.

A feed-back ignition timing control system was disclosed in U.S. Pat. No. 4,481,925 issued Nov. 13, 1984. The feed-back ignition timing control system controls the ignition timing of an internal combustion engine in response to the indicative pressure signal to keep the indicative pressure peak position within an optimum region. In this prior art system, contamination of the indicative pressure signal by high frequency noises is ignored by providing a gating function for taking the indicative peak information only during a predetermined crank angle region or zone. The particular crank angle zone is defined by timing pulses generated by a pulse generator including a toothed wheel and a pickup for producing a timing pulse at each time a tooth passes before it. The teeth are mounted on the periphery of the wheel equidistantly such as 60 degrees.

However, it has been a problem that such gating function defined by the timing pulses cannot supply the required freedom in view of the wide range of possible applications to various types of engines. In some cases, it has been required to more precisely define the crank angle zone so as to avoid influence by any possible noises in the indicative pressure signal and to obtain a sufficient calculation period for the desired ignition timing for the succeeding engine cycle.

SUMMARY OF THE INVENTION

It is therefore a primary object of the invention to provide an ignition timing control system for an internal combustion engine, which can precisely define a crank angle zone in which the maximum peak is expected to occur in the indicative pressure signal representing the inner pressure of the combustion chamber of the engine.

It is another object of the present invention to provide a ignition timing control system for an internal combustion engine, which defines a crank angle zone in which the maximum peak is expected to occur while changing the width of the crank angle zone in accordance with the operational conditions of the engine.

It is a further object of the present invention to provide an ignition timing control system for an internal combustion engine, which defines a crank angle zone in which the maximum peak is expected to occur while allowing the width of the zone to vary in dependence upon the waveform of the indicative pressure signal per se.

Further objects and advantages of the present invention will be apparent from the following description and the accompanying drawings.

SUMMARY OF THE DRAWINGS

FIG. 4B is a diagram showing a waveform of TDC pulses.

FIG. 4C is a diagram showing gate timings for receiving the indicative pressure peak data.

FIGS. 17 and 18 are flowcharts respectively showing subroutine programs interruptedly performed during the operation of the program of FIG. 15.

FIGS. 20A through 20G are diagrams respectively showing waveforms of signals appearing in the circuit of FIG. 19.

DETAILED DESCRIPTION OF EMBODIMENTS

Figure 2:
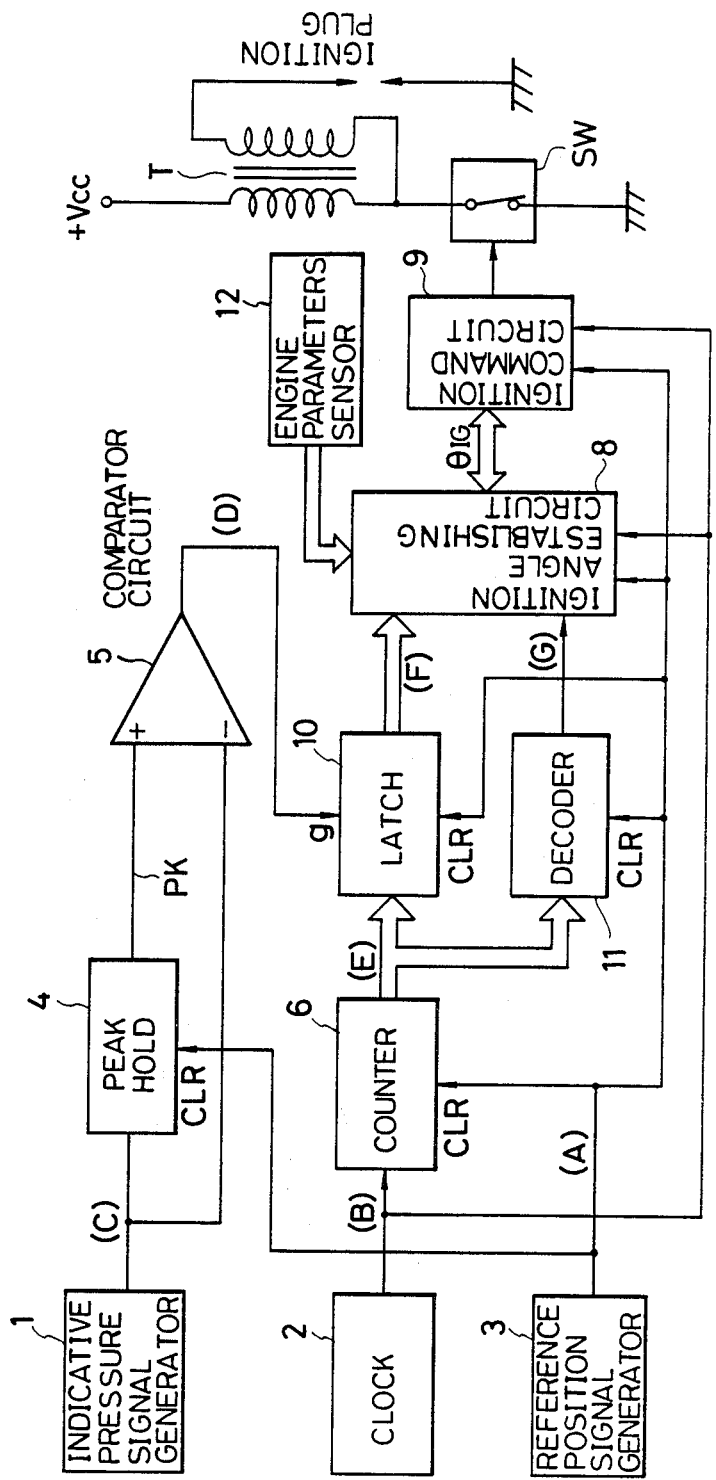
FIG. 2 is a circuit diagram showing an embodiment of the present invention.

FIG. 2 shows an ignition timing control system according to the present invention, and this system comprises an indicative pressure signal generating circuit 1 which generates an indicative pressure signal by using pressure sensor which may include a piezo-electric element and is inserted into a bore provided through a member such as a cylinder head which defines a combustion chamber of an internal combustion engine in such a manner that the detection head of the pressure sensor is exposed to the interior of the combustion chamber. A clock generating circuit 2 produces clock pulses appearing in synchronism with the rotation of the engine. Means for obtaining clock pulses which are in synchrohism with the rotation of the engine may consist of a disc which rotates in synchronism with the engine and has a plurality of slits in combination with a photo-coupler in such a manner that the clock pulses may be obtained from the output signal of the photo-coupler. A reference position generating circuit 3 produces a reference position signal, for example a TDC (Top Dead Center) pulse, which indicates that the crank angle position or the engine rotational angle position has reached a reference position. The TDC pulse may be obtained by providing a separate slit for TDC pulses in the disc which is already provided with the slits used for the clock generating circuit 2, in combination with a photocoupler for generating TDC pulses. A peak hold circuit 4 holds the maximum value of the indicative pressure signal after it is cleared by the reference position signal. A comparator circuit 5 produces a peak detection signal when the indicative pressure signal has fallen below its maximum value kept by the peak hold circuit 4. A counter 6 for measuring the crank angle position counts the number of the clock pulses and is reset by the reference position signal. The count value of the counter 6 which may be 8-bit data indicates the current value of the crank angle. A latch circuit 10 latches the count value of the counter 6 every time the peak detection signal from the comparison circuit 5 is supplied to the gate terminal g of the latch circuit 10, while a decoder 11 supplies a read-in command signal to an ignition angle establishing circuit 8 when the count value of the counter 6 reaches a predetermined value, for instance "63". The count value of "63" corresponds to a crank angle which is greater than any crank angle at which the indicative pressure peak is expected to occur, and the read-in timing is so selected that it will not be interfered by noises such as the combustion noises and the valve seating noises caused by the operation of the inlet and/or exhaust valves. The ignition angle establishing circuit 8 accordingly reads out or takes the contents of the latch circuit 10 and determines the indicative pressure peak position datum $\theta_{px}$ from the contents of the latch circuit 10. It is also possible to use a structure according to which the contents of the latch circuit 10 are supplied to the ignition timing establishing circuit 8 by way of a gate circuit which opens its gate by a read-in command signal from the decoder 11. The ignition angle establishing circuit 8 may consist of a microprocessor and supplies a desired ignition angle $\theta_{IG}$ data to an ignition command circuit 9 according to a program, which is described hereinafter, and the peak position information (data) supplied thereto. The ignition command circuit 9 detects the current value of the crank angle $\theta_{ig}$ by counting the clock pulses and using the reference position signal as a reference, and closes an ignition switch SW when the current crank $\theta_{ig}$ and the input $\theta_{IG}$ coincide with each other, whereby ignition current is passed through the primary winding of an ignition transformer T and a spark ignition takes place at an iginition plug. Accordingly, the desired ignition angle $\theta_{IG}$ is a next-cycle ignition angle datum for governing the actual ignition during the next engine cycle succeeding to the engine cycle having caused the appearance of the indicative pressure peak $\theta_{px}$ the ignition angle establishing circuit 8 and the ignition command circuit 9 form the ignition command means. The ignition angle establishing circuit 8 may be equipped with a mode in which the ignition angle establishing circuit 8 operates according to various parameter, such a rotational speed of the engine Ne, intake negative pressure $P_B$, throttle opening and so on, obtained from engine parameter sensors 12.

Figure 3:
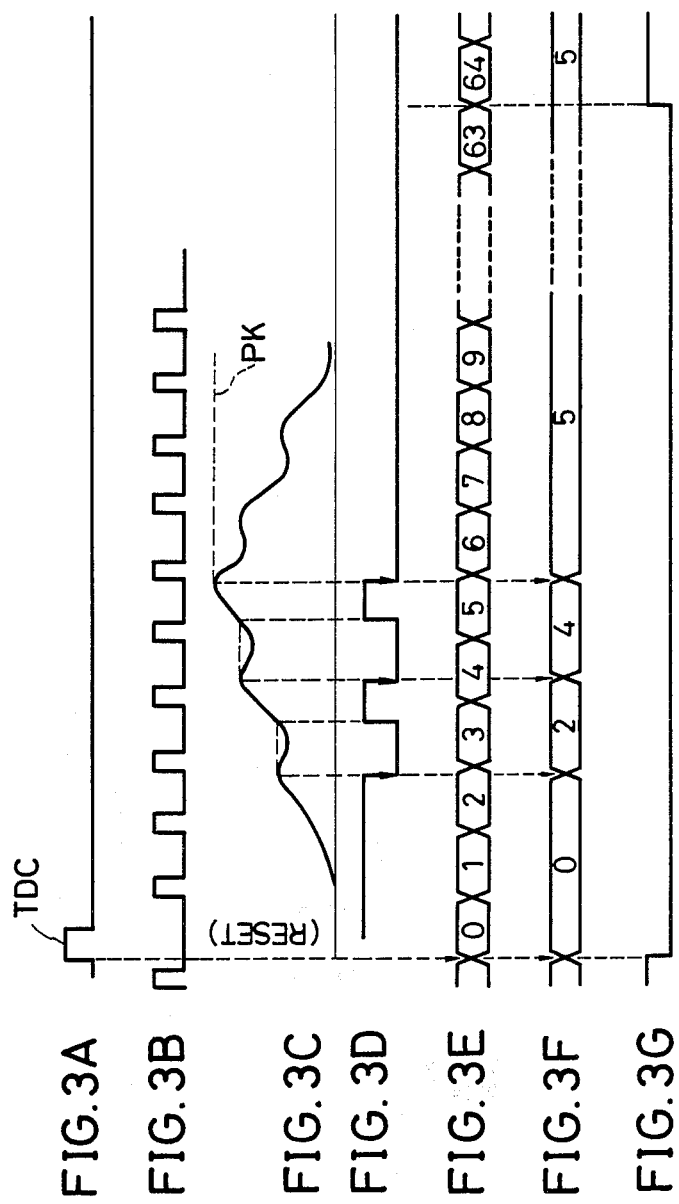
FIGS. 3A through 3G are diagrams illustrating waveforms of signals appearing in the circuit of FIG. 2.

FIGS. 3A to 3F show signal waveforms for illustrating the actions of the above-described circuits. Specifically, the reference position signal and the clock pulses appear as shown in FIGS. 3A and 3B, respectively. The indicative pressure signal changes in such a manner as shown by a solid line in FIG. 3C and the output of the peak hold circuit 4 therefore changes in such a manner as shown by the dotted line in FIG. 3C. The comparator circuit 5 produces a peak detection pulse signal upon detection of every local maximum of the indicative pressure signal as shown in FIG. 3D. FIG. 3E shows the changes of the count values of the counter 6 in decimals.

FIG. 3F shows the contents of the latch circuit 10 in decimals. FIG. 3G shows the changes in the output of the decoder 11 and, in this case, a higher level corresponds to the read-in command signal.

Figure 4:
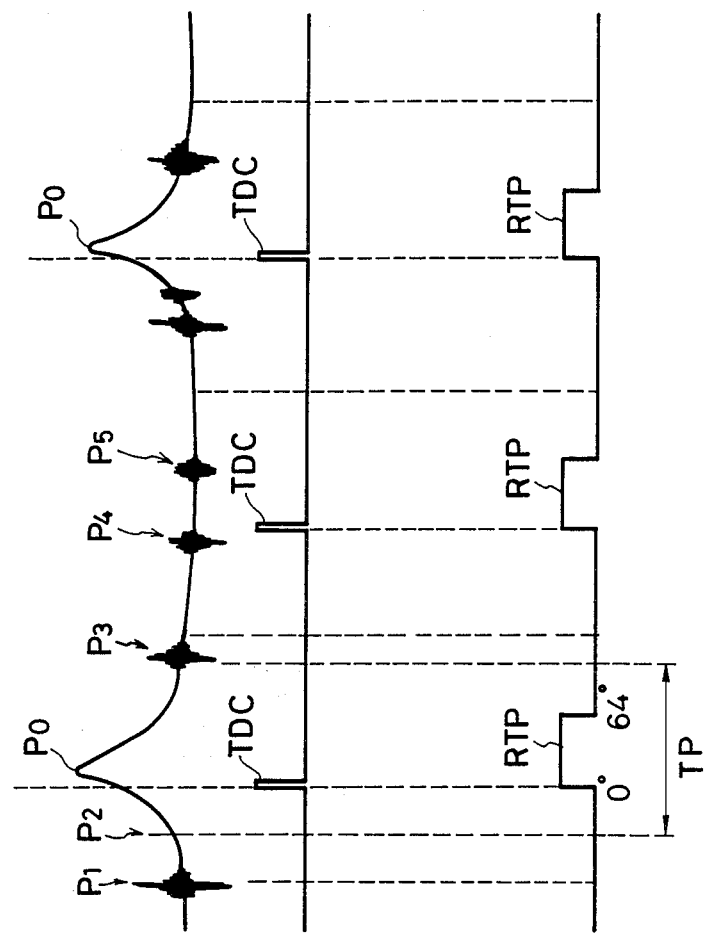
FIGS. 4A through C are a diagram showing a waveform of the indicative pressure signal.

FIG. 4A shows an example of waveform of the indicative pressure signal which contains maximum peak values $P_0$, valve seating noises $P_1$, $P_3$, $P_4$ and $P_5$, and an ignition noise $P_2$. FIG. 4B shows waveforms of the reference position pulses each appearing at the TDC. FIG. 4C shows that the ignition timing control system restrict the time period for picking up the maximum peak position information to a short time period RTP (0 degree to 64 degree), that is , from the TDC to the predetermined crank angle corresponding the decoding number of, in this embodiment, 63. The short time period RTP is contained within the time period from the ignition timing to the valve seating timing, so that the operation for picking up the maximum peak position information is not adversely affected by the ignition noises and valve seating noises etc.

Figure 1:
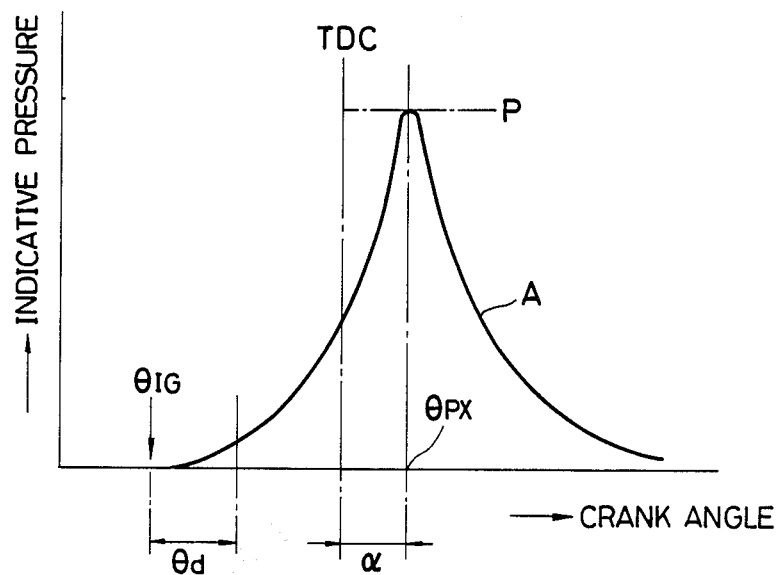
FIG. 1 is a graph showing the changes in the internal pressure of an engine cylinder.
Figure 5:
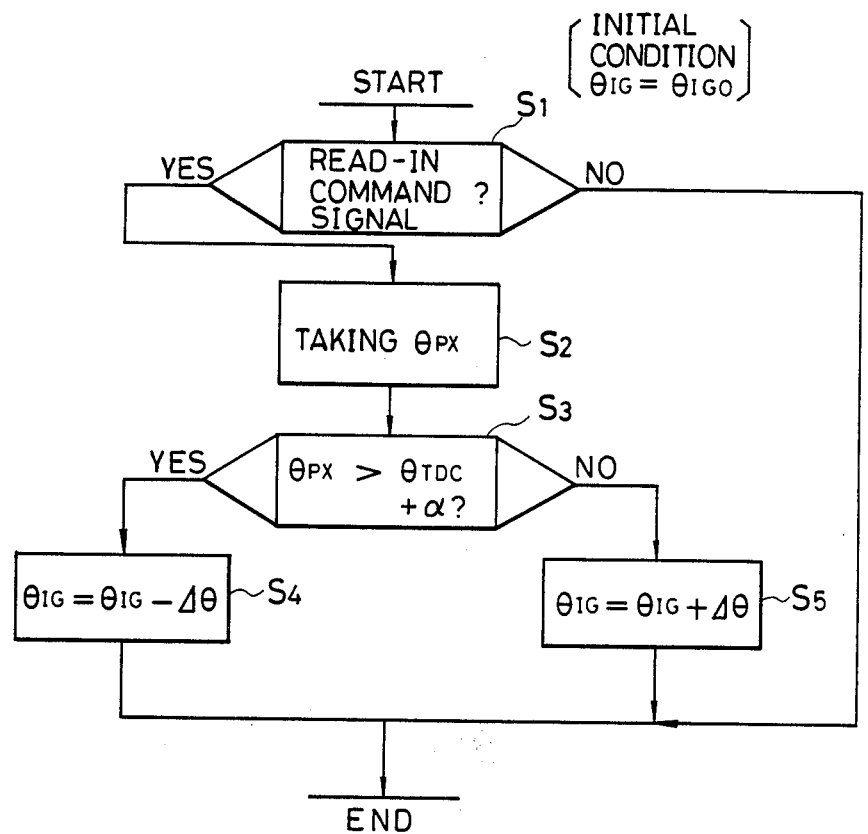
FIGS. 5 and 6 are flow charts describing basic action programs of the parts of the device of FIG. 2 made of a micro computer.

FIG. 5 shows an example of the program governing the ignition control operation of the ignition angle establishing circuit 8 of the system shown in FIG. 1 when the circuit 8 is made of a microprocessor. In performing the ignition control action, the ignition angle establishing circuit 8 initially establishes or determines the ignition angle $\theta_{IG}$ at an initial value $\theta_{IGO}$ and waits for the read-in command signal from the decoder 11, and, upon receipt of the read-in command signal, takes therein the latch contents of the latch circuit 10 as the peak position information $\theta_{px}$ (steps $S_1$ and $S_2$). Then, it is determined if the peak position information $\theta_{px}$ is greater than the sum of the top dead center angle $\theta_{TDC}$ and a certain angle $\alpha$, for instance 12 degrees, or not (step $S_3$). If $\theta_{px} > \theta_{TDC} + \alpha$, then the ignition angle $\theta_{IG}$ is advanced by $\Delta\theta$ (step $S_4$) and, if not, the ignition angle $\theta_{IG}$ is delayed by $\Delta\theta$ (step $S_5$). These actions from start to end, steps $S_1$ to $S_5$, are sequentially executed and cyclically repeated. This is the case with other programs which are referred to hereinafter.

Figure 6:
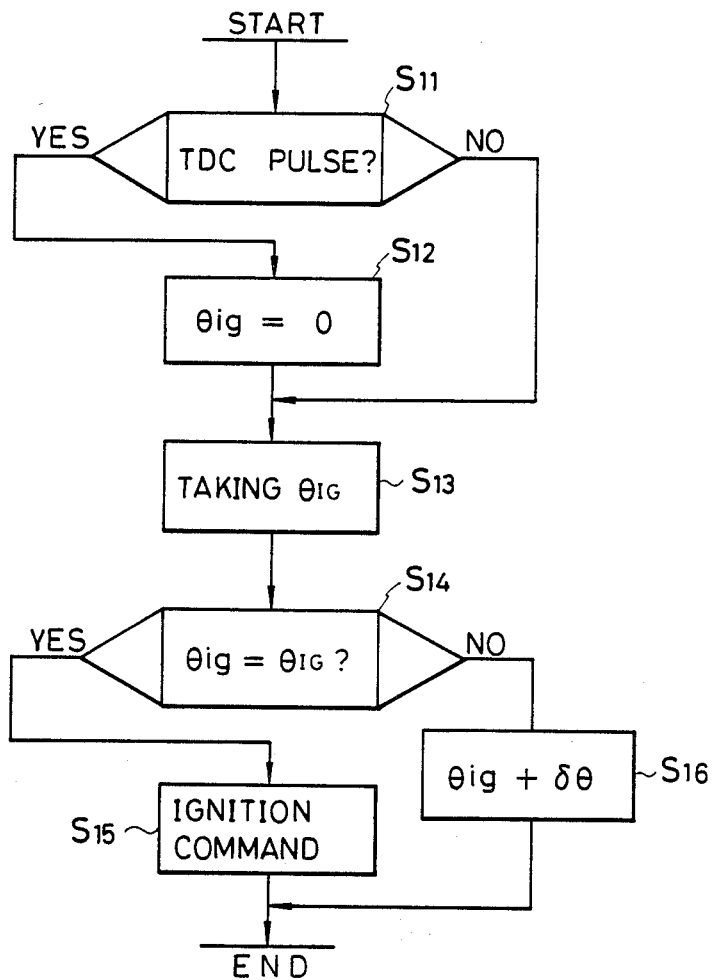

FIG. 6 shows an example of the action program of the ignition command circuit 9 when it is made of a microprocessor. When the ignition command circuit 9 detects the reference position signal (step $S_{11}$), the present value of the crank angle is set to $\theta_{ig}$ is set to $\theta_{TDC}$ (or a predetermined value) (step $S_{12}$) Then, the ignition angle data $\theta_{IG}$ from the ignition angle establishing circuit 8 is taken in (in step $S_{12}$) and this data is compared with the present value of the crank angle $\theta_{ig}$. If the relationship $\theta_{ig} = \theta_{IG}$ holds, the ignition command is issued (steps $S_{14}$ and $S_{15}$) and the ignition switch SW is closed. On the other hand, if $\theta_{ig} \neq \theta_{IG}$ holds, a unit angle $\delta\theta$ is added to the $\theta_{ig}$ (step $S_{16}$ the program flow stands by for the next program cycle. It is also possible to determine whether the difference between the $\theta_{ig}$ and $\theta_{IG}$ is greater or smaller than $\delta\theta$, in step $S_{14}$, instead of determining whether $\theta_{ig} = \theta_{IG}$ holds or not.

In the above-described embodiment, the peak position data $\theta_{px}$ was obtained in every engine cycle and the ignition angle for the next engine cycle is determined on the basis of the $\theta_{px}$ of the current engine cycle.

Figure 7:
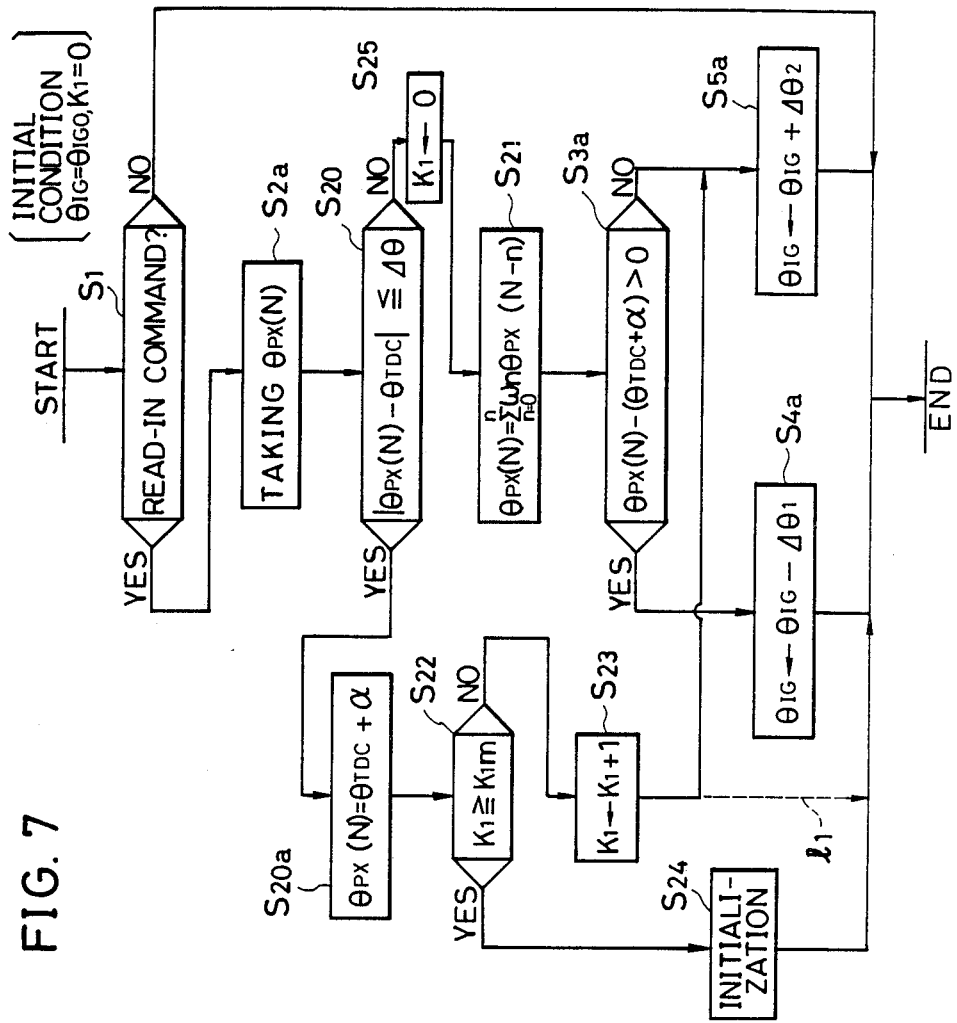
FIGS. 7 through 11 and 13 are flow charts describing action modes of a part of FIG. 2, which are respectively modified from that of FIG. 5.

FIG. 7 shows another example of the action program for the ignition angle establishing circuit 8 in the ignition timing control device according to the present invention. In this program, the basic flow is not different from that of the program of the flow chart given in FIG. 5 that is the indicative pressure peak data $\theta_{px}$ is taken in by the circuit 8 while the read-in command signal from the decoder 11 is present (steps $S_1$ and $S_{2a}$) and the ignition angle is delayed or advance in dependence on the difference between the $\theta_{px}$ and $(\theta_{TDC} + \alpha)$ (steps $S_{3a}$, $S_{4a}$ and $S_{5a}$).

However, according to this embodiment, $\theta_{px}$ is grasped as a group of data which are generated in the sequence and the indicative pressure peak position data obtained in the N-th engine cycle is expressed as $\theta_{px}(N)$ (step $S_{2a}$).

When an engine misfire occurs, combustion will not take place in the cylinder and the indicative pressure peak arises in the vicinity of $\theta_{TDC}$. Since, furthermore, the indicative pressure peak position data obtained in the engine cycle involving a misfire is not based on normal combustion, it is not appropriate to be used as a basis for the indicative pressure peak position control of the subsequent engine cycle. Therefore, $\theta_{px}(N)$ and $\theta_{TDC}$ are compared in advance and the arithmetic operation or $\theta_{px}(N)$ is performed only when the difference thereof is greater than $\Delta\theta$ (steps $S_{20}$ and $S_{21}$). In this arithmetic operation step $S_{21}$, the current data value is corrected by the preceding indicative pressure peak position data values in the $(N-1)$-th, $(N-2)$-th, ..., $(N-n)$-th engine cycles according to the following formula to enhance the stability of the feedback system.

$$\theta_{px}(N) = \sum_{n=0}^{n} \omega_n \theta_{px}(N-n)$$

As a concrete example, the current data may be derived from the average value of the four preceding data and the current data by setting $\omega_0 = \omega_1 = \omega_3 = \omega_4 = 1/5$ and $\omega_5 = \omega_6 = \ldots = \omega_n = 0$. The averaging method is not limited by this, but may be based on averaging of an arbitrary number of data. And, it is also possible to set $\omega_n = (1/L)^n$ (where $L > 1$ and $n > 0$).

The ignition angle advance and delay control may be made according to the thus derived results of comparison between $\theta_{px}$ and $(\theta_{TDC} + \alpha)$ (steps $S_{4a}$ and $S_{5a}$), but the angle advance $\Delta\theta_1$ and the angle delay $\Delta\theta_2$ need not be equal to each other but it may be that either $\Delta\theta_1 > \Delta\theta_2$ or $\Delta\theta_1 > \Delta\theta_2$ independence on the characteristics of the feedback system. Further, $\Delta\theta_1$ and $\Delta\theta_2$ may be functions of the difference between and $\theta_{px}$ and $(\theta_{TDC} + \alpha)$.

When the difference between and $\theta_{px}$ and $\theta_{TDC}$ is equal to or less than $\Delta\theta$, $\theta_{px}(N)$ is made equal to $\theta_{TDC}+$ (step $S_{20a}$). As long as $K_1 < K_{1m}$ (step $S_{22}$), $K_1$ is set to equal to $K_1 + 1$ and an ignition angle delay control is conducted, and, if $K_1 \geq K_{1m}$ by consecutive occurrence of misfires, an initialization step is conducted for resetting the ignition timing (step $S_{24}$). If $|\theta_{px} - \theta TDC| > \Delta\theta$, then $K_1$ is set to zero and the program flow advances to the next step (step $S_{25}$). It is also possible not to conduct the ignition angle delay control when the engine misfire occurs and let the program flow advance to the next program cycle as indicated by the broken line $l_1$. It is also possible to ignore the exhaust stroke of the engine when this ignition timing control device is applied to a four-stroke engine. When it is the case, the exhaust stroke detection sensor may be omitted.

Figure 8:
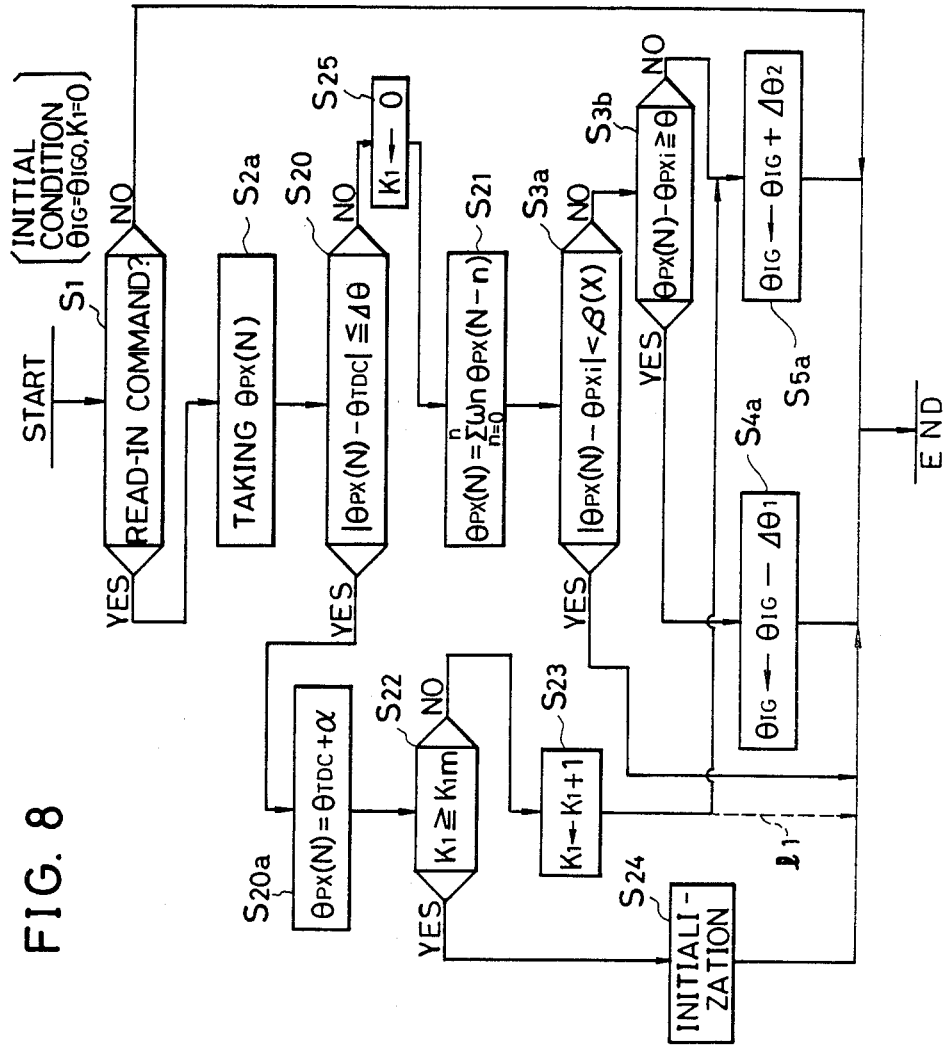

FIG. 8 shows still another example of the action program for the ignition angle establishing circuit 8. In this program, the control target value $\theta_{pxi}$ is not set to the single angle $(\theta_{TDC} + \alpha)$ but set to a control target zone $\theta_{pxi} \pm \beta(x)$. Thereby, the stability of the feedback system may be improved. The parameter $x$ of $\beta(x)$ may be either one of engine rotational speed Ne, throttle opening $\theta_{TH}$ and engine intake manifold vacuum $P_B$. It is also possible to vary the value of $\beta$ using a combination of these parameters as a variable. Otherwise, this program is similar to that of FIG. 6. Further, it is also possible to set $\beta(x)$ as a constant $\beta$.

Figure 9:
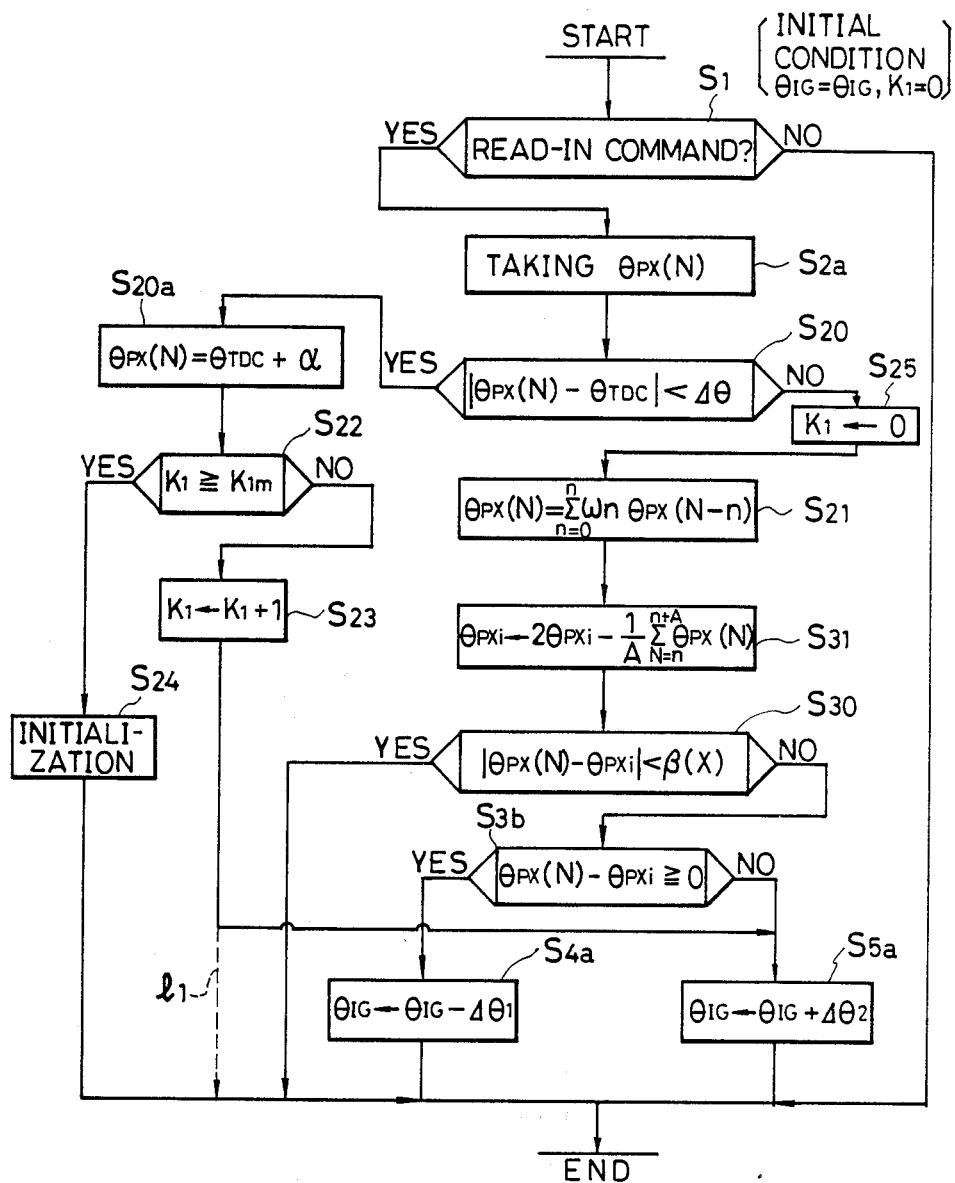

FIG. 9 shows another example of the action program performed by the ignition angle establishing circuit 8. In this program, the control target value $\theta_{pxi}$ for $\theta_{px}(N)$ is not fixed but the difference between $\theta_{pxi}$ and the average value of $$\theta_{px}(N) \left( = \frac{1}{A} \sum_{N=A}^{n+A} \theta_{px}(N) \right)$$

is taken into consideration for deriving $\theta_{pxi}$ to obtain a new $\theta_{pxi}$ which is equal to $(2\theta_{pxi} - \theta_{px}(N))$. This program is the same as the program given in the flow chart of FIG. 8 except the above mentioned point.

Figure 10:
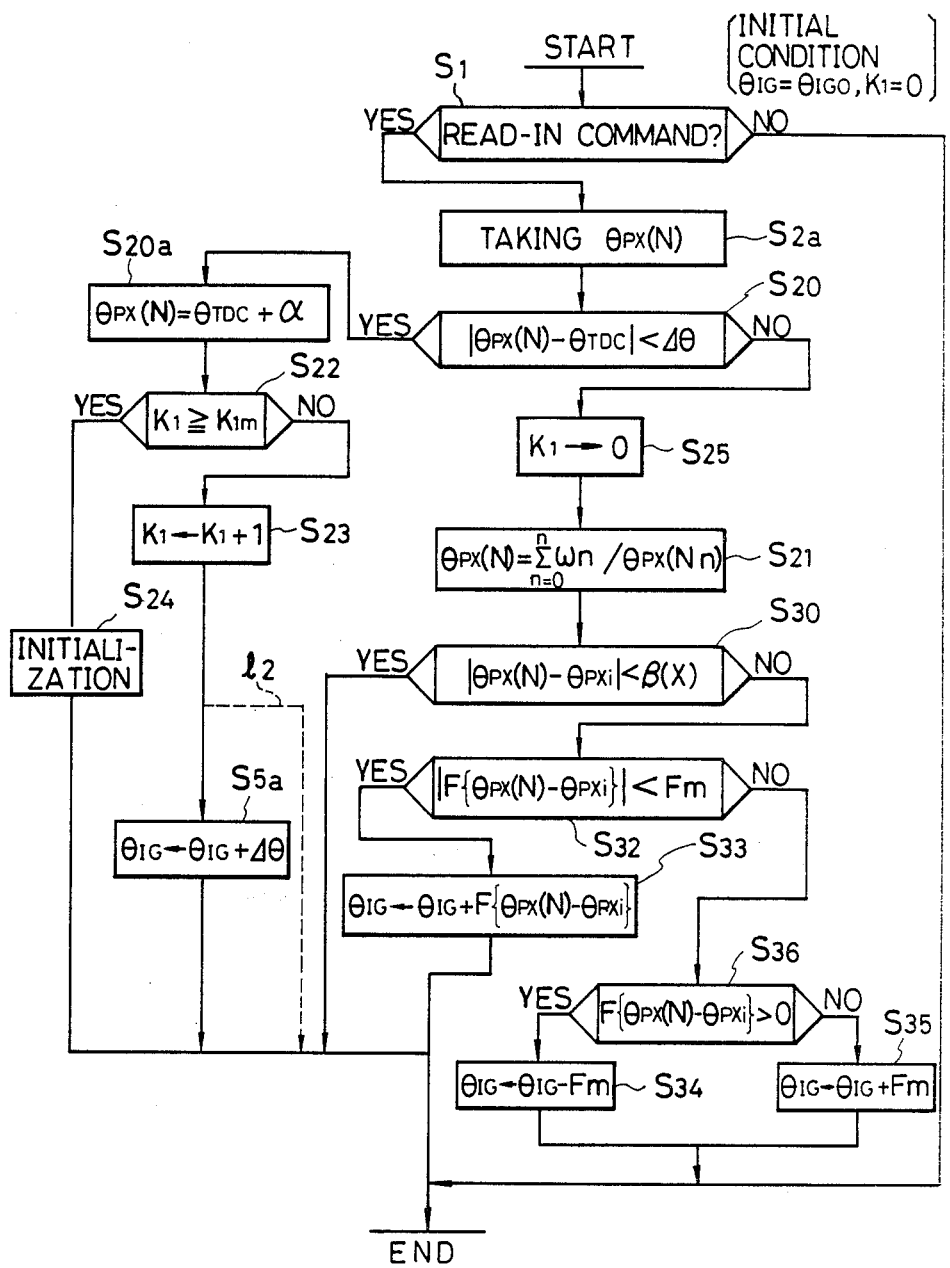

FIG. 10 shows another example of the action program to be performed by the ignition angle establishing circuit 8. This program is the same as the program of FIG. 7 in that the control target value $\theta_{pxi}$ for $\theta_{px}(N)$ is determined as a control target zone $\theta_{pxi} \pm \beta(x)$ instead of a single angle. However, the correction of $\theta_{IG}$ is given by an odd function $F[\theta_{px}(N) - \theta_{pxi}]$ having the deviation of $\theta_{px}(N)$ from $\theta_{pxi}$, or $[\theta_{px}(N) - \theta_{pxi}]$, as a variable (step S33). This odd function F(Z) may be an odd function having a single inflection point which may be expressed in the general form of $(Z-\gamma)^n$ such as $Z^3, Z^5,$... In particular, when $n \geq 3$, the feedback is rapidly increased as the deviation of $\theta_{px}$ (N) from the target value $\theta_{pxi}$ increases and a brisk feedback control may be expected. On the other hand since the possibility of producing a hunting may arise in the feedback system when the feedback is excessive, the maximum feedback is limited. The above-described actions are conducted in the steps S32, S34 and S35 of the flow chart of FIG. 9.

In this case, the step S5a which delays the ignition timing by $\Delta\theta$ may be either conserved or omitted, as it is indicated by a broken line l2.

Figure 11:
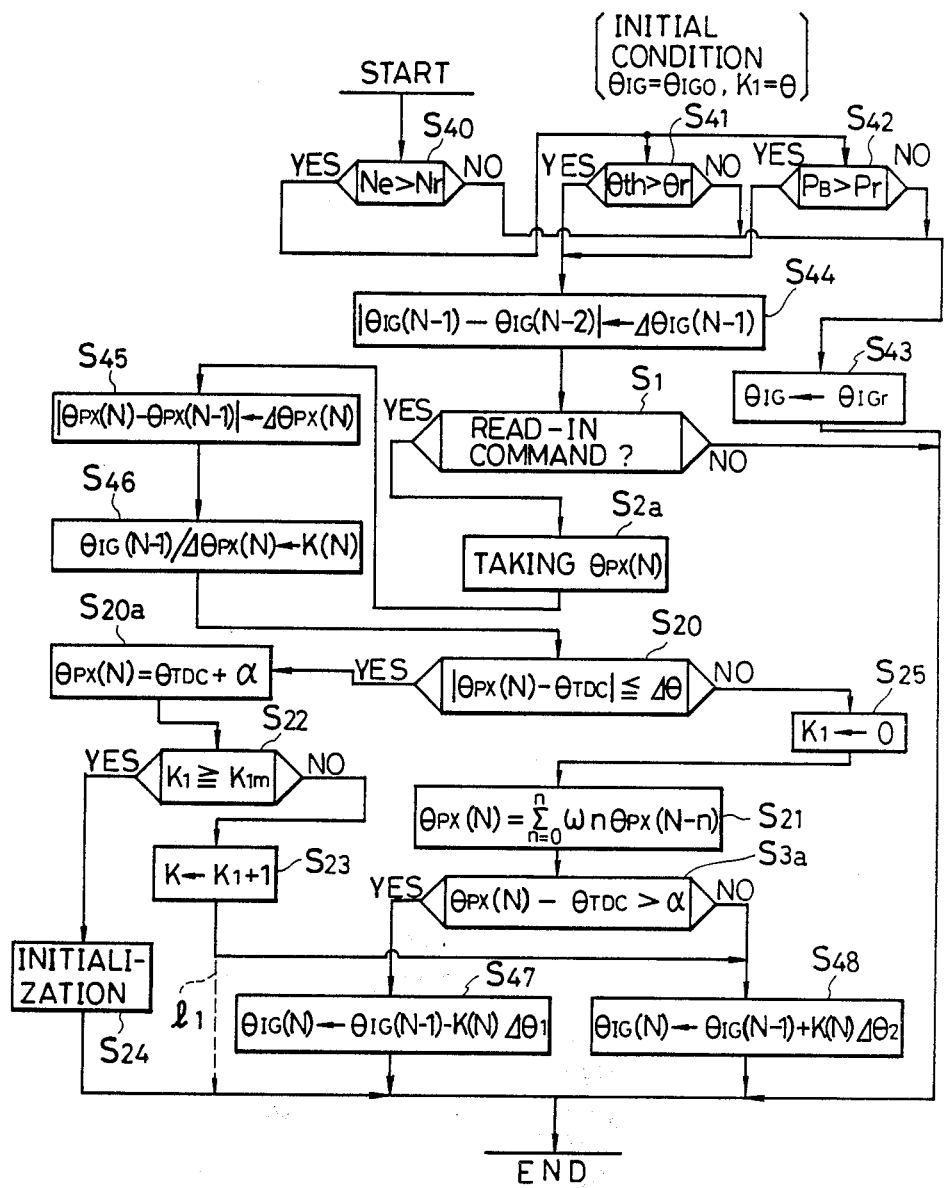
Figure 12:
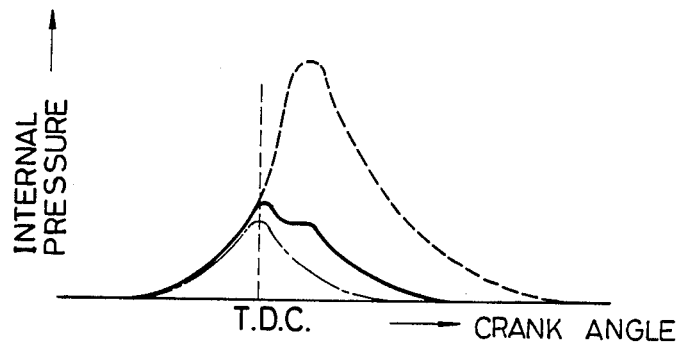
FIG. 12 is a graph showing that the indicative pressure change curve is dependent on the engine operating condition.

FIG. 11 shows yet another example of the action program of the ignition angle establishing circuit 8. Specifically, in this program, rotational speed of the engine Ne, throttle opening $\theta$th, an intake manifold vacuum $P_B$ among various engine parameters are compared with reference values Nr, $\theta$r and Pr, respectively, and the ignition angle $\theta_{IG}$ is fixed to $\theta_{IGr}$ insofar as they do not exceed their reference varies (steps S40, S41, S42 and S43). The reference ignition angle $\theta_{IGr}$ may be varied in accordance with either engine parameters such as engine rotational speed and so on or a value selected from a map based on engine parameters. When either one of Ne, $\theta_{th}$ an $P_B$ has exceeded Nr, $\theta$r and Pr, respectively, the feedback action is to take place. The reason why the switch over between the determination of the ignition angle $\theta_{IG}$ based on feedback control on the basis of various engine parameters and the use of the fixed $\theta_{IG}$ is made here is, the indicative pressure near the top dead center due only to the compression of air may be greater than the indicative pressure near the top dead center due to the combustion in the cylinder. When the engine rotational speed is low, the changes in the indicative pressure in such a case are shown by the chain-dot line in FIG. 12. When the throttle opening is small or the intake negative pressure is great, the engine load is small or the throttle opening is extremely small, the indicative pressure changes in such a manner as shown by a solid line curve in FIG. 12. In this case also, the position of the maximum indicative pressure peak is located near the top dead center and it is not suitable to feedback control the ignition angle. The dotted line curve in FIG. 12 shows the changes of the indicative pressure under normal operation condition. It is now to be understood that either step S41 or S42 may be omitted, if preferred.

When it is detected that the engine is under normal operation condition or, in other words, is not in the state of low engine rotational speed, the state of extremely small throttle opening or the state of low engine load condition, detection of the indicative pressure peak position $\theta_{px}$(N) may be performed. However, in this program, the difference $\Delta\theta_{IG}$(N−1) between the ignition angle $\theta_{IG}$(N−1) which was set up in the previous program cycle and the ignition angle $\theta_{IG}$(N−2) which was set up in the yet previous program cycle is first compared (step S44). Then, upon detection of the presence of the read-in command signal, the indicative pressure peak data $\theta_{px}$(N) is taken in (steps S1 or S2a) Thereafter, the contents of the step S44 may be executed.

Then, the difference $\Delta\theta_{px}$(N) between the present $\theta_{px}$(N) and the preceding $\Delta_{px}$(N−1) is computed S45), and the ratio K(N) of $\Delta\theta_{px}$(N) to the already obtained $\Delta\theta_{IG}$(N−1) is derived in the step S46. Thereafter, the steps S20, S21, S22, S23, S24, S25 and S3a are executed in the same way as described in connection with FIG. 7.

In thus advancing or delaying the previous ignition angle $\theta_{IG}$(N−1) according to the peak position of $\theta_{px}$ (N), $\theta_{IG}$(N−1) is either decreased or increased by K(N)·$\Delta\theta_1$ or K(N)·$\Delta\theta_2$ (steps S47 and S48).

It means that, since the current peak position $\theta_{px}$(N) is based on the ignition angle $\theta_{IG}$(N−1) computed during the preceding cycle and the previous peak position is based on the yet previous ignition angle $\theta_{IG}$(N−2), the degree of influence of the change $\Delta\theta_{IG}$(N−1) from $\theta_{IG}$(N−2) to $\theta_{IG}$(N−1) on the change $\Delta\theta_{px}$(N) from $\theta_{px}$(N−1) to $\theta_{px}$(N) is represented by K(N) and it is reflected in the angle advance or delay control of the currently established ignition angle $\theta_{IG}$(N) for the ignition of the next engine cycle.

Figure 13:
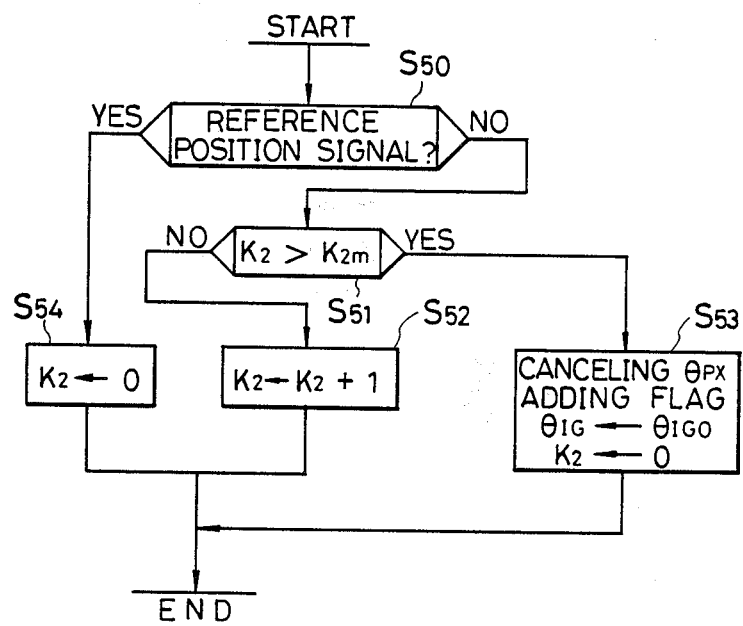

FIG. 13 shows a subroutine program which is effective for use in the ignition angle establishing circuit 8.

The ignition angle establishing circuit containing this subroutine program determines whether the reference position signal such as the TDC pulse is present or not (step S50). If not, it is determined whether the time interval of the absence of the reference position signal has exceeded (K$_{2m}$×clock period) or not (step S51). If not, 1 is added to the constant K$_2$ and the program flow is terminated (step S52). If, the time interval of the absence of the reference position signal has exceeded a time period of K$_{2m}$×(clock period), then the set up ignition angle $\theta_{IG}$ is restored to the initial value $\theta_{IGo}$ and K$_2$ is set to zero while a cancel flag for disregarding this $\theta_{px}$ data is added to this $\theta_{px}$ data (step S53). When the presence of the reference position signal is detected, K$_2$ is set to zero (step S54).

This subroutine program is effective for determining the end of engine operation and for preparing the next engine start.

Figure 14:
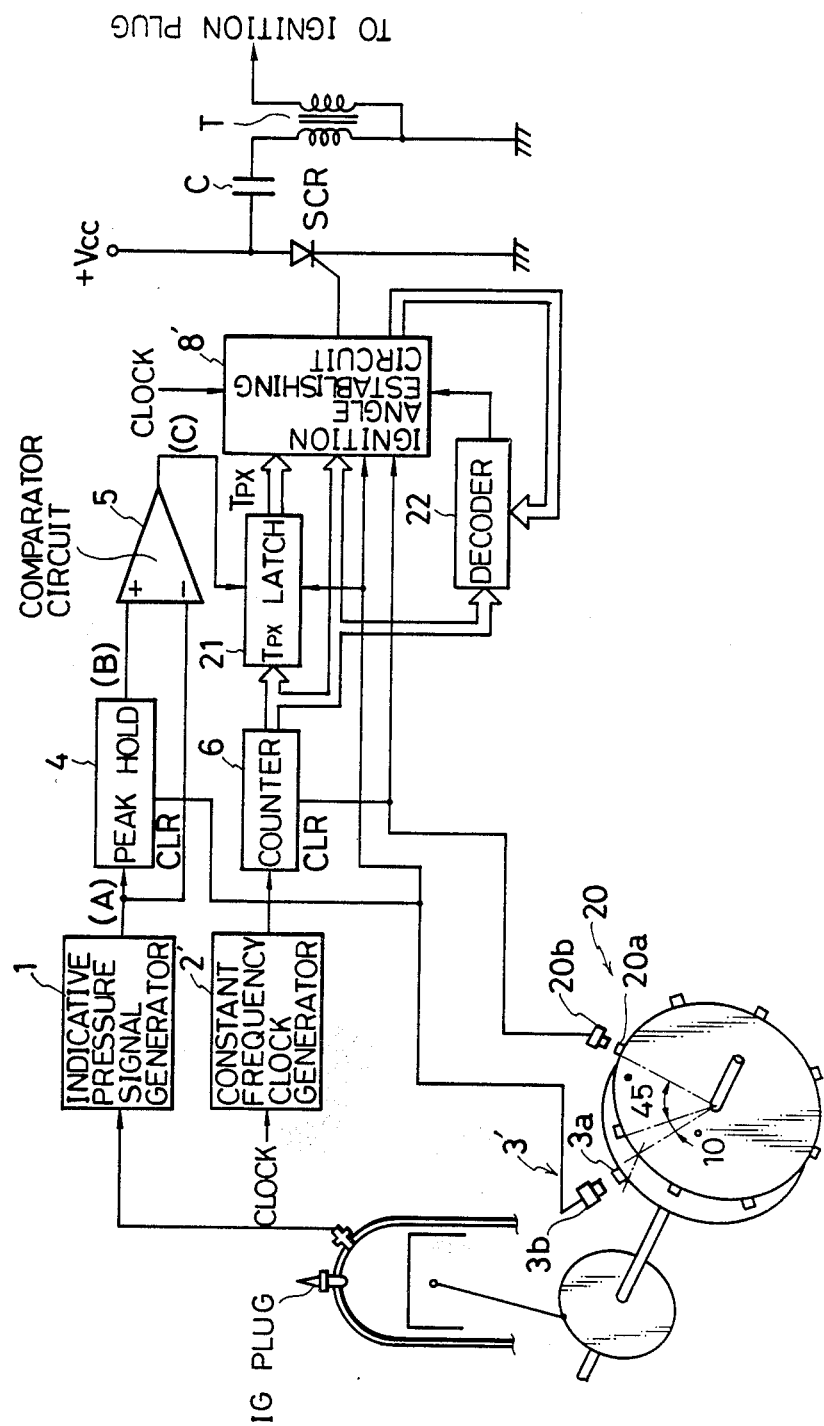
FIG. 14 is a block diagram showing another ignition timing control system according to the present invention.
Figure 15:
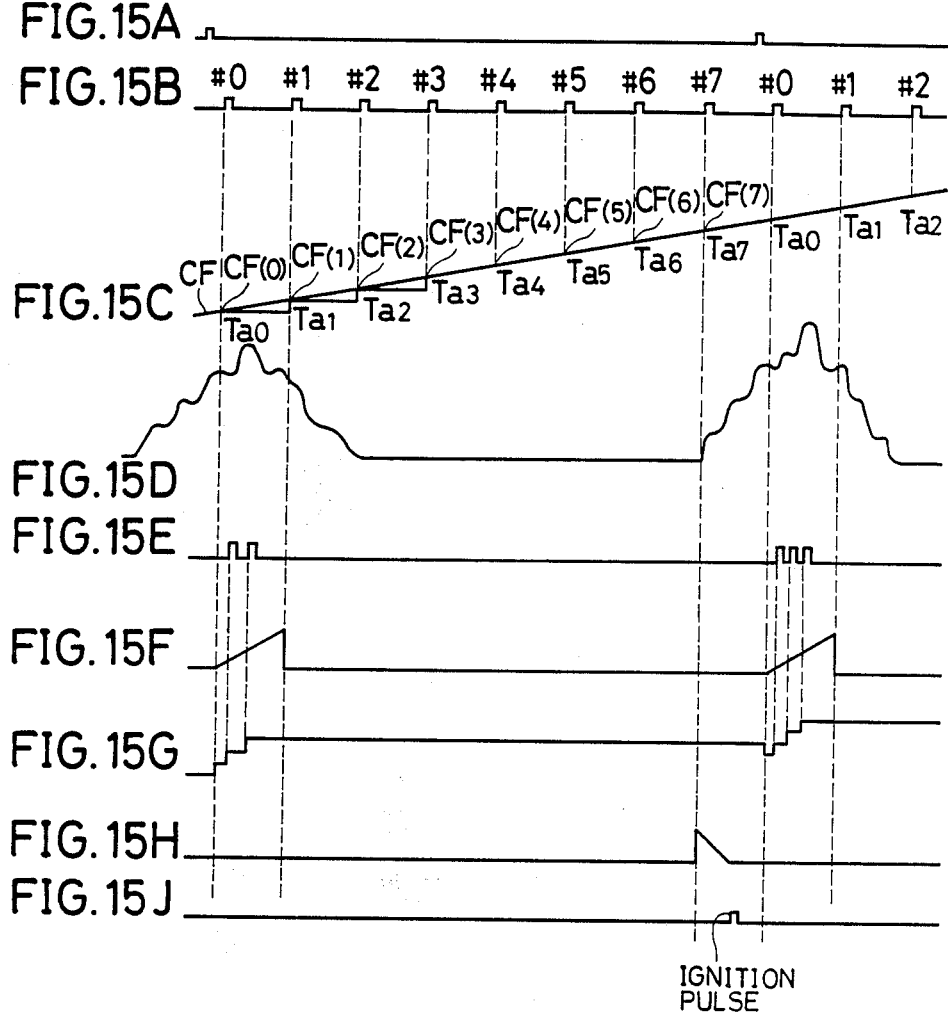
FIGS. 15A through 15H and 15J are diagrams respectively showing waveforms of signals appearing in the circuit of FIG. 14.

In FIG. 14, there is shown another ignition timing control system according to the present invention which includes an indicative pressure signal generator 1 having the same function as the indicative pressure signal generator 1 shown in FIG. 2. There is provided a constant frequency clock generator 2' which produces a constant frequency clock signal. The frequency clock generator 2 may be a divider for dividing in frequency a high frequency clock signal for triggering a microprocessor used for the ignition angle establishing circuit 2' described hereinafter. A reference position signal generator 3' is made of a magnetic projection 3a mounted on a disc rotating in synchronism with the crank angle of the engine and a magnetic sensor 3b, such as a so-called pulser coil, for detecting the passage of the projection before it. The reference position signal or pulse produced from the reference position signal generator 3' appears at a crank angle of, for example, 10° before TDC. Thus, the reference position pulse may be referred to as a BTDC pulse. There is provided a peak hold circuit 4 which is the same as the peak hold circuit 4 of the circuit shown in FIG. 2. A comparator 5 produces a peak detection pulse in response to the output signal from the peak hold circuit 4 and the indicative pressure signal as the peak hold circuit 5 of FIG. 2 functions. A counter 6 counts the clock pulses from the clock pulse generator 2' until it is cleared by a timing pulse produced from a timing pulse generator 20. The timing pulse generator 20 is composed of a plurality of magnetic projections 20a equidistantly mounted on the periphery of a disc rotating in synchronism with the crank shaft, and a magnetic sensor 20b for detecting passage of each of the projections before it so as to produce the timing pulse at each passage of the projection. In this embodiment, the projections are eight in total number and spaced from each other by 45°. A $T_{px}$ latch circuit 21 is adapted to latch the content of the counter 6 when it is triggered by the peak detection signal from the comparator 5 and to apply its latch content to an ignition angle establishing circuit 8'. The ignition angle establishing circuit 8' has a function basically similar to that of the ignition angle establishing circuit 8 and may be preferably constituted by a microprocessor governed by a program explained hereinafter. The content of the counter 6 is also applied to the ignition angle establishing circuit 8' and to a decoder 21. The decoder 21 is adapted to produce a read-in command signal when the content of the counter 6 becomes equal to a reference value. The decoder 21 may be a programable decoder which produces a logic "1" signal when its input digital signal is equal to the reference value determined by the parallel digital command signal which relates in this case to the engine speed signal Ne. This reference value is so determined as to relate to the engine rotational speed signal Ne produced from the ignition angle establishing circuit 8' so that the reference value constantly defines a crank angle range slightly larger than a crank angle range in which the indicative pressure peak may appear.

This arrangement is made to avoid any adverse effect due to any possible noise such as valve seating noises which may occur after the crank angle corresponding to the reference value. The ignition angle establishing circuit 8 reads the contents of the latch circuit 21 in response to the read-in command signal from the decoder 21 and determines that the indicative pressure peak has appeared at a crank angle corresponding to the latched content. The ignition angle establishing circuit 8' compares the latched content representing the indicative pressure peak position with the content of the counter 6 at the appearance of the timing pulse and calculates the present crank angle at which the indicative pressure peak has appeared. Then, the ignition angle establishing circuit 8' modifies a preceding crank angle calculated at a preceding cycle by adding thereto a certain angle value or subtracting therefrom another certain angle value to establish a new ignition angle for this time.

It is now to be understood that a gate may be provided for relaying the latched content of the latch circuit 6 to the ignition angle establishing circuit 8' in response to the read-in command signal from the decoder 22.

It is further to be noted that a circuit may be provided for calculating the engine rotational speed Ne on the basis of the constant frequency clock signal, timing pulses and reference position signal.

The reference value may be determined in the decoder 12 as being inversely proportional to the engine rotational speed so as to produce the read-in command signal at a generally constant crank angle whereby it is possible to obtain a time period sufficient for the calculating of the ignition angle establishment in the ignition angle establishing circuit 8'.

The ignition angle establishing circuit 8' in this case functions to trigger a gate-controlled rectifier SCR in an ignition circuit of the so-called charge-discharge type.

FIGS. 15A through 15J are diagrams respectively showing waveforms of signals appearing in the system of FIG. 14 so as to explain the function of the ignition angle establishing circuit 8'.

In FIGS. 15A and 15B, there are shown the reference pulses (each called as "A pulse" hereinafter) appearing at BTDC 10° and the timing pulses (each called as "B pulse" 10° after the "A pulse" and Nos. 1 through 7 "B pulses" appear consecutively with an interval corresponding to a 45° crank angle during each one complete rotation of the crank shaft.

FIG. 15C shows a manner of variations of the count value CF in a free-run counter (not shown) contained in the ignition angle establishing circuit 8' in response to the clock pulses. It is to be noted that the counting frequency and phase for the free-run counter is made to coincide with those of the constant frequency clock 2'. A single oscillator may be provided for supplying the same frequency signal both to the constant frequency clock generator 2' and the ignition angle establishing circuit 8' in which the frequency signal is divided into a suitable reduced frequency.

FIG. 15D shows in solid line variations of the indicative pressure signal produced from the indicative pressure signal generator 1. The comparator circuit 5 produces the peak detection signals as shown in FIG. 14E at the respective appearances of peaks of the indicative pressure signal. FIG. 15F shows the changes in the count value of the counter 6. FIG. 15G shows the changes in the latched value $T_{px}$ in the latch circuit 21.

FIG. 15H shows a manner of change of a count number T contained in the ignition angle establishing circuit 8', which count number T will be explained hereinafter with reference to FIG. 16.

FIG. 15J shows a waveform of an ignition command pulse produced from the ignition angle establishing circuit 8'.

Figure 16:
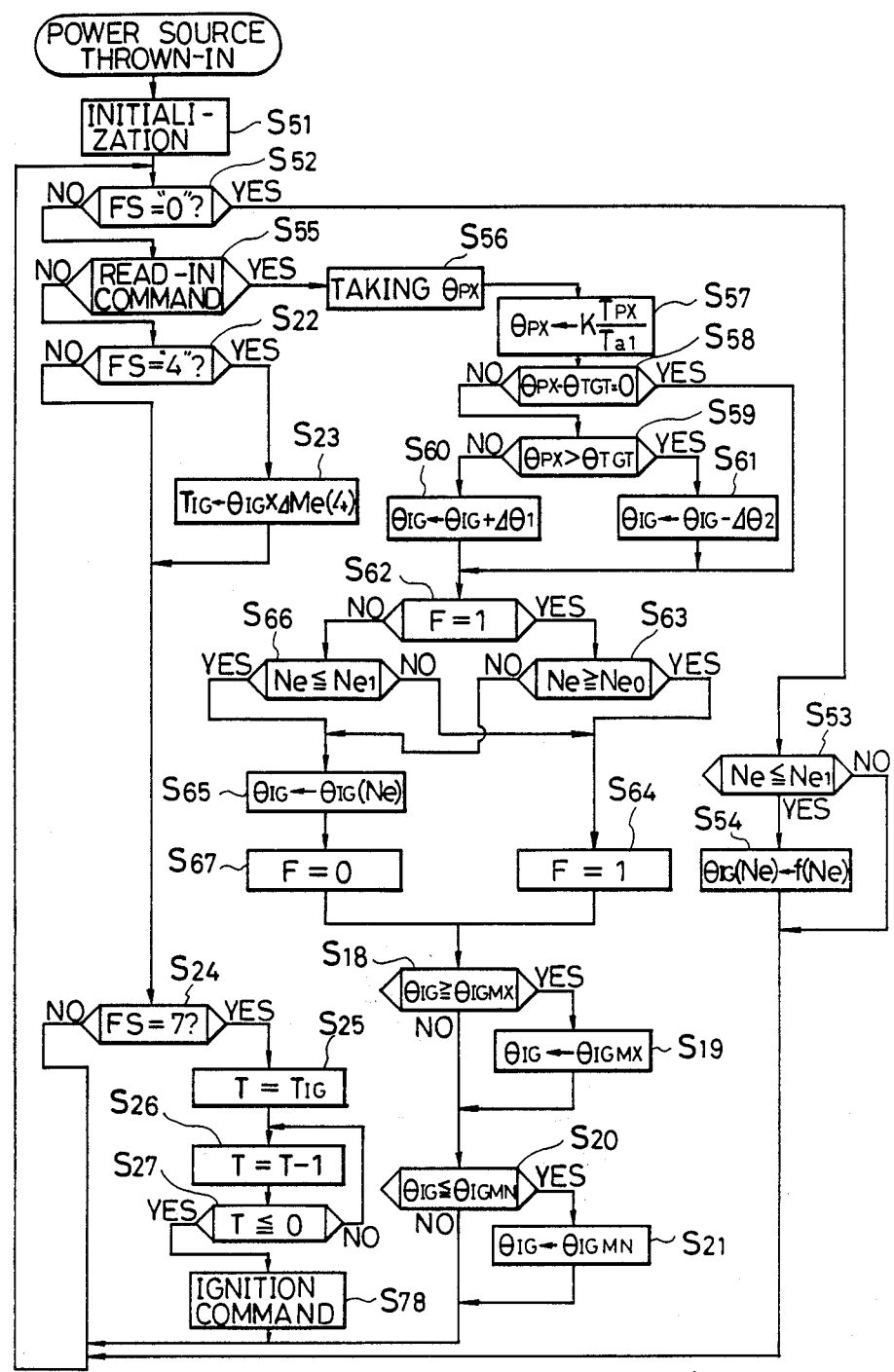
FIG. 16 is a flowchart showing an operation program performed in the ignition angle establishing circuit in the circuit of FIG. 14.

In FIG. 16, there is shown a flow chart describing main routine work performed by the ignition angle establishing circuit 8' which establishes an optimum ignition angle $\theta_{IG}$ and produces an ignition command or trigger signal when the actual crank angle reaches the established optimum crank angle $\theta_{IG}$.

As seen from the figure, when the power source is supplied to the ignition angle establishing circuit 8', the ignition angle establishing circuit 8' starts performing the main routine work sequence. At the first step $S_{51}$, a predetermined initialization is made. At a step $S_{52}$, a count value FS of an inside stage counter is reviewed, which stage counter is contained in the ignition angle establishing circuit and triggered by the clock pulses in the ignition angle establishing circuit 8'. If the count value FS is "0", the engine rotational speed signal Ne is picked up from a preselected memory area in memory means (not shown) such as a ROM and the engine rotational speed signal Ne is compared with a critical engine speed Ne such as 2800 r.p.m. (step $S_{53}$). When Ne is equal to or smaller than $Ne_1$, an engine speed related ignition angle $\theta_{IG}(Ne)$ is made equal to a function value f(Ne) which may be a so-called map value (step $S_{54}$). When Ne is larger than $Ne_1$, the step $S_{52}$ is again performed. When the count value FS is equal to "0", then it is determined whether or not the read-in command signal from the decoder 22 exists (step $S_{55}$). When the read-in command signal exists, the $T_{px}$ latch data is taken from the latch circuit 21 (step $S_{56}$). Then, the indicative pressure peak angle $\theta_{px}$ is obtained by calculating $K \times T_{px}/T_{a1}$, where $T_{a1}$ data is taken from the counter 6 by means of "B pulse" interruption routine starting at the leading edge of No. 1 "B pulse" while interrupting the main routine (step $S_{57}$). The thus obtained $\theta_{px}$ is compared with a target peak angle $\theta_{TGT}$ of, for example, an ATDC 12° crank angle (step $S_{58}$). When $\theta_{px}$ is not equal to $\theta_{TGT}$, then it is determined which is larger $\theta_{px}$ and $\theta_{TGT}$ (step $S_{59}$). When the angle $\theta_{px}$ is smaller than the target angle $\theta_{TGT}$, then the ignition angle $\theta_{IG}$ is retarded by $\Delta\theta_1$ (step $S_{60}$). When, to the contrary, the angle $\theta_{px}$ is larger than the angle $\theta_{TGT}$, then the ignition angle $\theta_{IG}$ is advanced by $\Delta\theta_2$ (step $S_{61}$). It is to be understood that $\Delta\theta_1$ may be equal to $\Delta\theta_2$, if preferred. It is further to be understood that the angle $\theta_{px}$ may be regarded as being equal to the target angle $\theta_{TGT}$ as long as a difference between the angles $\theta_{px}$ and $\theta_{TGT}$ is smaller than a predetermined small value. At the succeeding step $S_{62}$, it is determined whether or not a flag F exists (step $S_{62}$). The existence of F (F=1) means that the ignition angle $\theta_{IG}$ has been established during a one-time preceding cycle by means of this feedback ignition timing control which is called as "feedback ignition timing control mode" hereinafter. When the flag F exists, the engine speed data Ne is compared with a predetermined engine speed data $Ne_0$ of, for example, 2500 r.p.m. which is smaller than the engine speed $Ne_1$ (step $S_{63}$). When the engine speed data Ne is equal to or larger than the data $Ne_0$, the flag F is made to be "1" (step $S_{64}$). When the engine speed data Ne is smaller than the data $Ne_0$, the ignition angle $\theta_{IG}$ is made to be the already obtained angle $\theta_{IG}(Ne)$ (step $S_{65}$). When, on the other hand, the flag F is equal to "0", it is true that the ignition angle $\theta_{IG}$ has been established in the one-time previous cycle to be equal to the map value f(Ne) through a "map control mode". At this moment, the engine speed data Ne is compared with the data $Ne_1$. (step $S_{66}$). When Ne is larger than $Ne_1$, the "feedback control mode" should be done at the present cycle and therefore the ignition angle $\theta_{IG}$ determined through the previous steps $S_{58}$ through $S_{61}$ is maintained and the flag F is made to be "1". (step $S_{64}$). When, on the other hand, Ne is equal to or smaller than the data $Ne_1$, the "map control mode" should be done again in the present cycle and therefore the ignition angle $\theta_{IG}$ is made to be equal to the map value $\theta_{IG}$ (Ne) (step $S_{65}$) and the flag F is made to be "0" (step $S_{67}$).

It should be understood that the two different critical values $Ne_1$ and $Ne_2$ are selectively used in dependence upon the value of the flag F in order to perform a hysteresis characteristic for the change-over between the map control mode and the feedback control mode. Thus, $Ne_1$ may be equal to $Ne_2$ and those steps for establishing and determining the flag F may be deleted if it is unnecessary to establish such a hysteresis characteristic.

The thus obtained $\theta_{IG}$ is confined between a maximum threshold $\theta_{IGMX}$ and a minimum threshold $\theta_{IGMN}$ during steps $S_{66}$ through $S_{71}$. Then, the execution will return to the step $S_{52}$.

When it is realized that the count value FS is equal to "4" in a step $S_{72}$ and an ignition timing $T_{IG}$ is calculated as $\theta_{IG} \times Me(4)$ which has been obtained through a "B pulse" interruption routine explained hereinafter, preparation is made for the next ignition command.

When it is realized that the count value FS is equal to "7" in a step $S_{74}$, a count value T of an inner ignition counter (not shown) contained in the circuit 8 is set to the timing $T_{IG}$ in a step $S_{75}$. When the count value T becomes zero or smaller than zero, then an ignition command is generated in steps $S_{75}$ through $S_{78}$. The ignition command is supplied to the gate terminal of the gate-controlled rectifier SCR through a certain port of the circuit 8'. FIG. 14H shows a manner of reduction of the count value T and FIG. 14J shows a waveform of the ignition command signal.

It is now to be understood that the above-mentioned main routine is performed in response to the constant frequency clock pulses. The "A pulse" interruption sub-routine shown in FIG. 16 is executed while interruption the main routine in response to the "A pulse". In the first step $S_{80}$ of this sub-routine, the count value FS is set to "−1". Then, an ignition command is generated in the next step $S_{81}$. This step $S_{81}$ is provided to avoid misfiring and therefore this step $S_{81}$ may be omitted, if preferred. Namely, a principal job performed by the "A pulse" interruption sub-routine is to preset the count value FS of the stage counter to "−1".

FIG. 18 shows the "B pulse" interruption sub-routine to be executed in response to the "B pulse" while interrupting the main routine. In the first step $S_{90}$ thereof at which the "B pulse" rises up, the circuit 8' takes the respective count values Tam (m=0∼7) of the clock counter 6 and the respective count values CF(m) (m=0∼7). In the next step $S_{91}$, a data Me(m) is obtained by calculating a difference between a present value CF(m) and a preceding value CF(m−1). In the next step $S_{92}$, the values Me (m−7), Me(m−6), . . . , Me(m−1) are summed together to obtain Me(m). In the succeeding step $S_{93}$, an engine rotational speed Ne is given by inverting the value Me(m). Then, the engine speed Ne is compared with a cranking speed $N_{CR}$ such as 2000 r.p.m. at the next step $S_{94}$.

When Ne is smaller than $N_{CR}$, that is, the engine is under the cranking the program enters the initialization step $S_{51}$. When, on the other hand, Ne is equal to or larger than $N_{CR}$, the count value FS of the stage counter is increased by "1" in the step $S_{95}$ and this sub-routine ends to return to the main routine.

The ignition angle establishing circuit 8' is governed by the above-mentioned main routine program and "A pulse" and "B pulse" sub-routines, thereby to establish an ignition angle, to convert the established ignition angle into an ignition timing and finally to give the ignition command to the ignition circuit.

In the ignition timing control system described above with reference to FIGS. 14 through 18, the latch circuit 21 latches a count value of the counter 6 and the ignition angle establishing circuit 8' takes the latched count value when a count value of the counter 6 exceeds a reference value which varies in accordance with the engine rotational speed Ne. The ignition angle establishing circuit 8' will not significantly be influenced by any possible noises such as valve seating noises and ignition noises to be contained the indicative pressure signal and furthermore the ignition angle establishing circuit 8' can determine the indicative peak position at a relatively early timing thereby to remain a sufficient time period for the calculation of the required ignition angle establishment.

Figure 19:
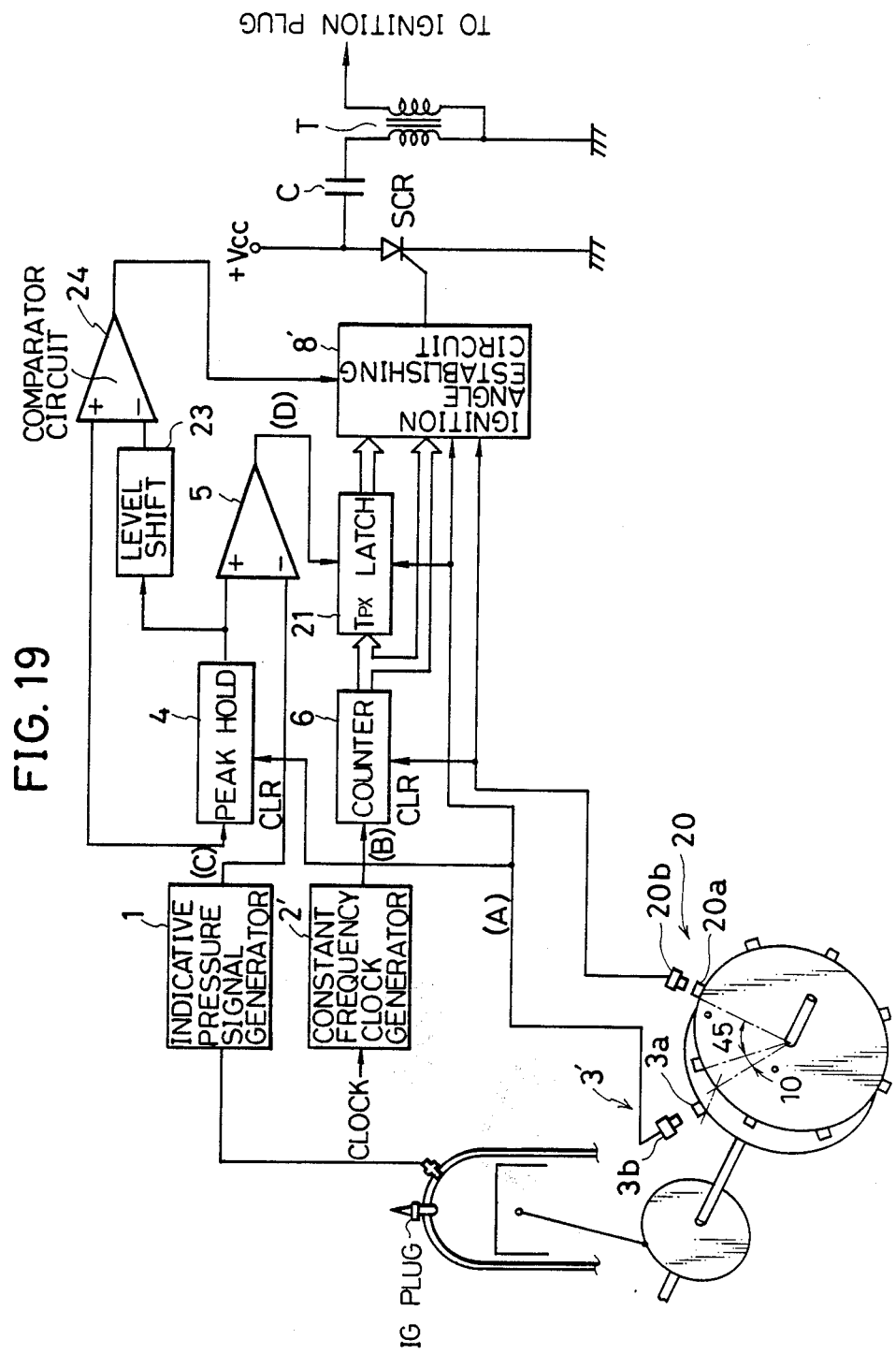
FIG. 19 is a block diagram showing another ignition timing control system according to the present invention.

FIG. 19 shows still another ignition timing control system identically the same as that of FIG. 14 except that the decoder 22 has been omitted but a level shifter 23 and a comparator 24 are provided which produce a read-in command signal when the indicative pressure signal lowers below a reference level Vr which is obtained by suitably shifting in level from the indicative peak level PK, for example, a trisection of the peak level PK. The shifting rate of the level shifter 23 is determined according to experiences or experiments.

The above arangement is based on a fact that when the indicative pressure signal largely lowers below a first indicative pressure peak, the particular first indicative pressure peak should be the maximum and any noise peaks caused by noises such as valve seating noises will be ignored.

The ignition angle establishing circuit 8' takes the peak position count $T_{px}$ from the latch circuit 21 in response to the read-in command signal produced from the comparator 24 and calculates the indicative pressure peak position on the basis of the peak position count $T_{px}$ and a count content $T_{a1}$ of the counter 6 at the appearance of a timing pulse so as to establish a present time ignition angle by modifying a previous ignition angle.

It is to be understood a gate circuit may be provided for relaying the peak position count $T_{px}$ from the latch circuit 21 to the ignition angle establishing circuit 8' in response to the read-in command signal.

FIG. 20A shows the reference position pulse such as the BTDC pulse produced by the reference position signal generator 3' and FIG. 20B shows the constant frequency clock pulses consecutively appearing from the clock pulse generator 2'. FIG. 20C shows the indicative pressure signal in a solid line and the output signal from the peak hold circuit 4 in a broken line, the maximum level of which is indicated by PK. The reference level Vr is indicated by a phantom line.

FIG. 20D shows a waveform of the peak detection signal from the comparator 5 and FIG. 20E shows a manner of variation of the count value of the counter 6 which counts the constant frequency clock pulses from the generator 2' as already described. FIG. 20F shows a manner of variation of the latch content of the latch circuit 21. FIG. 20D shows a waveform of the read-in command signal from the comparator 24 which is issued when the indicative pressure signal lowers in level below the reference level Vr.

As seen from the above, the ignition angle establishing circuit 8' takes the latch content in the latch circuit 21 as the peak position information immediately when the indicative pressure signal lowers in level below the reference level Vr, so that the ignition angle establishing circuit 8' will not be adversely affected by possible incorrect latch content of the latch circuit 21 which may be caused by valve seating noises etc. to be possibly contained in the indicative pressure signal.

Furthermore, it is possible to save time for the ignition angle establishing circuit 8' to take in the latch content from the latch circuit 21 in comparison with a system in which the indicative peak position information is determined at a predetermined ignition angle for example ATDC 60°.

It is to be understood that the read-in command generating system including the level shifter 23 and the comparator 24 can be utilized for the system of FIG. 2 while omitting the decoder 11, thereby applying the read-in command signal from the comparator 24 but not from the decoder 11 up to the ignition angle establishing circuit 8'.

What is claimed is:

1. An ignition timing control system for an internal combustion engine, comprising:
reference pulse generating means for generating a reference position pulse each time the rotational angle position of said internal combustion engine reaches a predetermined reference crank angle position;
pressure signal generating means for generating a pressure signal which is representative of the pressure in the combustion chamber of said engine;
maximum peak pressure position detecting means for detecting a maximum peak pressure position of said indicative pressure signal during an interval between the consecutive two of said reference position pulses so as to produce a maximum peak pressure position data signal representing the crank angle of said engine at which minimum peak pressure occurs; and
ignition angle establishing means for producing an error signal representative of a difference between said maximum peak pressure position provided by said maximum peak pressure position data signal and a desired peak pressure position, and for establishing an ignition angle at which said engine is to be ignited within the next engine cycle, in accordance with said error signal so as to reduce the magnitude of said error signal;
said maximum peak pressure position detecting means including,
clock pulse generating means for geneating clock pulses,
peak detecting means for producing a peak appearance pulse each time a peak appears in said pressure signal having a pressure level higher than the level of said pressure signal at the occurrence of other said peak appearance pulses since the last said reference position pulse,
count means for continuously counting the number of clock pulses appearing since the last said reference position pulse to develop a count value,
latch means for latching said count value developed by said count means each time said peak appearance pulse is produced by said peak determining means,
read-in command signal geneating means for generating a read-in command signal when said count value reaches a reference count value, and
determining means for establishing the latched count value from said latch means as said maximum peak pressure position data in response to said read-in command signal.

2. An ignition timing control system according to claim 1, wherein said count means is a binary counter receiving said clock pulses and producing a binary code signal representing the number of said clock pulses supplied thereto;
said read-in command signal generating means including a decoder receiving said binary code signal from said counter and having a logic circuit for producing a logic signal as said read-in command signal when its input binary code signal represents a number equal to said reference count value.

3. An ignition timing control system according to claim 2, wherein said logic circuit has a fixed logic for producing said logic signal when its input binary code signal represents a number equal to said reference count value which is predetermined.

4. An ignition timing control system according to claim 2, wherein said logic circuit is a programmable logic circuit which changes its logic in response to the engine rotational speed of said engine.

5. An ignition timing control system for an internal combustion engine, comprising:
reference pulse generating means for generating a reference position pulse each time the rotational angle position of said internal combustion engine reaches a predetermined reference angle position;

pressure signal generating means for generating a pressure signal which is representaitve of the pressure in the combustion chamber of said engine;

maximum peak pressure position detecting means for detecting a maximum peak pressure position of said indicative pressure signal during an interval between the consecutive two of said reference position pulses so as to produce a maximum peak pressure position data signal representing the crank angle of said engine at which maximum peak pressure occurs; and ignition angle establishing means for producing an error signal representative of a difference between said maximum peak pressure position provided by said maximum peak pressure position data signal and a desired peak pressure position and for establishing an ignition angle at which said engine is to be ignited within the next engine cycle, in accordance with said error signal, said peak pressure position detecting means including, clock pulse generating means for generating clock pulses, peak detecting means for producing a peak appearance pulse each time a peak appears in said pressure signal having a pressure level higher than the level of said pressure signal at the occurrence of other said peak appearance pulses since the last said reference position pulse, count means for continuously counting the number of clock pulses appearing since the last said reference position pulse to develop a count value, latch means for latching said count value developed by said count means each time said peak appearance pulse is produced by said peak detecting means, read-in command signal generating means for generating a read-in command signal when said pressure signal drops in level below a reference level determined on the basis of said maximum peak value occurring since the last said reference pulse, and determining means for determining the latched count value from said latch means as said maximum peak pressure position data in response to said read-in command signal.

6. An ignition timing control system according to claim 5, wherein said read-in command signal generating means includes, a peak holder for holding a highest peak level of said pressure signal since the last said reference pulse, a level shifter for producing a reference voltage having said reference level by shifting in level said peak level held by said peak holder, and a comparator circuit for producing said read-in command signal when said pressure signal drops in level below said reference voltage.

7. An ignition timing control system according to claim 1 or 5, wherein said peak detecting means includes, a peak holder for holding a highest peak level of said pressure signal after the last reference pulse, and a comparator for producing a pulse lasting as long as an instantaneous level of said pressure signal exceeds the peak level held by said peak holder.

* * * * *